(12) United States Patent
Meyer et al.

(10) Patent No.: US 6,360,871 B1
(45) Date of Patent: Mar. 26, 2002

(54) DEVICE FOR GROUPING OR ISOLATING ARTICLES

(75) Inventors: Erwin Meyer, Hamminkeln; Helmut Diederichs, Isselburg; Silke Evans, Kevelaer; Stefan Elsperger, Rudering, all of (DE)

(73) Assignee: Kettner GmbH, Rosenheim (DE)

( * ) Notice: Subject to any disclaimer, the term of this patent is extended or adjusted under 35 U.S.C. 154(b) by 0 days.

(21) Appl. No.: 09/462,139

(22) PCT Filed: May 5, 1999

(86) PCT No.: PCT/EP99/03061
§ 371 Date: Dec. 29, 1999
§ 102(e) Date: Dec. 29, 1999

(87) PCT Pub. No.: WO99/57042
PCT Pub. Date: Nov. 11, 1999

(30) Foreign Application Priority Data

May 5, 1998 (DE) .................................. 298 07 979 U (51) Int. Cl.⁷ .............................................. B65G 25/00
(52) U.S. Cl. .................................... 198/419.1; 198/429
(58) Field of Search ........................ 198/419.1, 429, 198/459.6, 459.7, 459.1, 468.9

(56) References Cited

U.S. PATENT DOCUMENTS 4,082,176 A * 4/1978 Pommer .............. 198/419.1 X
4,625,499 A * 12/1986 Yamaguchi et al. . 198/419.1 X
4,921,088 A * 5/1990 Ter Horst ............ 198/419.1 X

FOREIGN PATENT DOCUMENTS

| DE | 1272262 |   | 7/1968  |
| DE | 4036341 |   | 5/1992  |
| DE | 4222972 |   | 1/1993  |
| DE | 4439728 | * | 5/1996  |
| EP | 126553  |   | 11/1984 |
| EP | 400295  | * | 12/1990 |
| EP | 447123  | * | 9/1991  |
| EP | 485937  | * | 5/1992  |
| GB | 2090804 |   | 7/1982  |
| WO | 99/03766| * | 1/1999  |

* cited by examiner

Primary Examiner—James R. Bidwell
(74) Attorney, Agent, or Firm—Marshall, Gerstein, & Borun (57) ABSTRACT

A device for grouping or isolating articles which are transported on a conveyor belt in one or more closed rows and are separated from each other individually or in groups for subsequent processing. At least two elements are provided which can be moved back and forth independently of each other and parallel to the direction of transport, and which can be made to engage with or disengage from the articles in a controlled manner.

37 Claims, 12 Drawing Sheets

DEVICE FOR GROUPING OR ISOLATING ARTICLES

FIELD OF THE INVENTION

The invention pertains to a device for grouping or isolating articles such as during boxing, wrapping, or other article-handling operations.

BACKGROUND OF THE INVENTION

Devices of this type are required at the inlet areas of packaging machinery in order to isolate individual articles or groups of articles that approach as a flow of a closely packed rows, and which are subsequently packed into boxes, cartons or shrink wrap foil. In order to achieve this objective different types of construction have been suggested, such as, e.g., grouping devices that are arranged under a conveyor belt that supplies the articles and are equipped with fingers that reach through gaps between the individual conveyor belts that form the conveyor path (EP 0 485 937 B1). In addition to poor accessibility to the grouping mechanism, the necessary gaps between the individual conveyor belts are also a disadvantage, since the stability and smooth flow of the transported articles is impaired, while foreign bodies can fall into the grouping mechanism and cause faults.

Moreover, grouping devices that are arranged laterally on conveyor belts and engage the flow of articles are also known, but these are designed in a very space-consuming manner and, disadvantageously, can only be used for a single track flow of articles (EP 0 447 123 B1, EP 0 126 553 B1, EP 0 400 295 A1).

A further disadvantage of the known devices resides in the extensive conversion that is required for articles having different formats.

The object of this invention is to provide a compact, easily accessible and flexibly applicable device for grouping or isolating articles.

As a result of the use of program controlled drives for the grouping device, there is a high level of service convenience along with a conversion time that, simultaneously, is as short as possible to change over to different types of articles. Differing single article lengths or article group lengths can be adjusted in a gapless manner by merely changing the program or modifying the program.

If the stopper cams that are required to isolate the groups of articles are integrated into the guide rails, then, according to one advantageous further development of the invention, the adaptation of the grouping device takes place at the same time as the rail adjustment that, in any case, is necessary when a conversion to another articles dimension is required.

In the case of a multi-path design, it is also convenient to have good access from above, while no space is required underneath the conveyor for the grouping device. Exemplified embodiments are explained in the following on the basis of the figures.

BRIEF DESCRIPTION OF THE DRAWINGS

Shown are.

DETAILED DESCRIPTION OF THE PREFERRED EMBODIMENT

Figure 1:
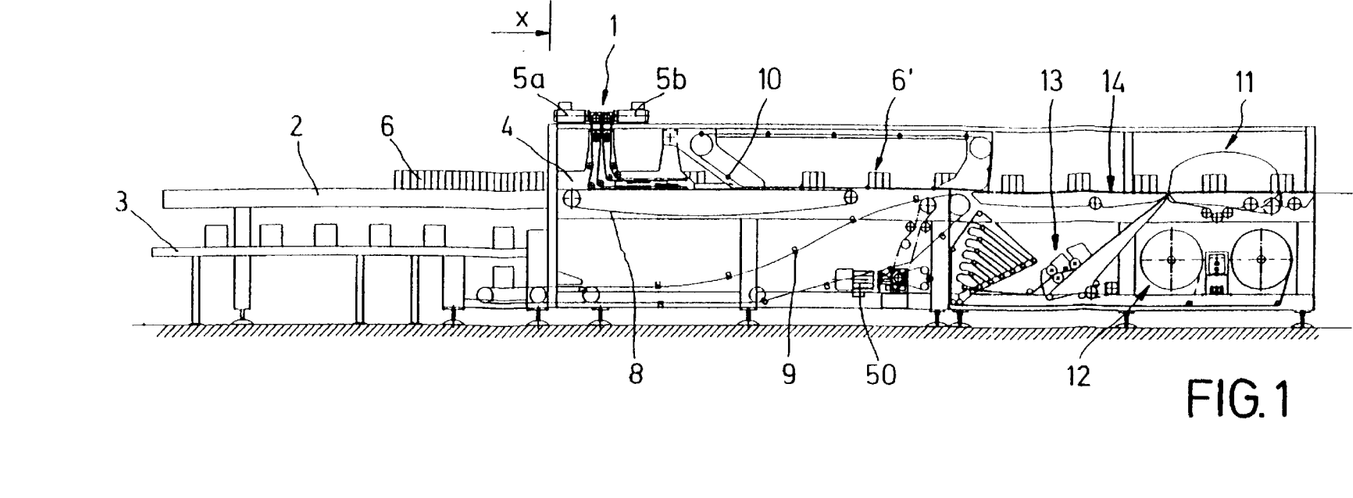
FIG. 1 A lateral view of a film packaging machine, incorporating the present invention FIG. 2 a top view of the machine according to FIG. 1 in schematic illustration, FIG. 3 a front view of the machine as seen from the X view in FIG. 1,.
Figure 2:
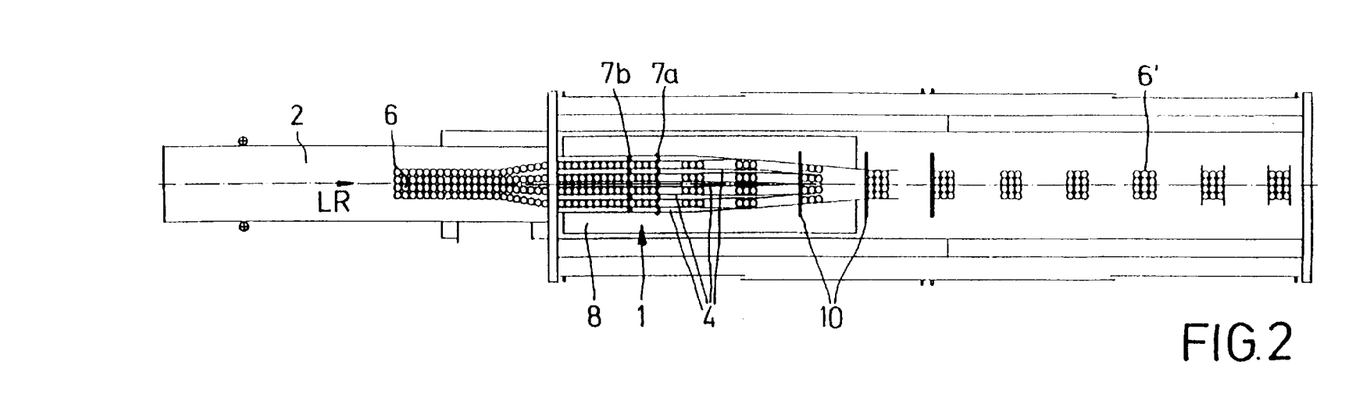

The most important component groups can be seen in the lateral view of the film packaging machine illustrated in FIG. 1. Arranged underneath on the left hand side there is an article conveyor 2 with a carton staple conveyor 3, both of which are continually driven in the same direction. The article conveyor leads to a grouping station 1 with guide rails 4 that form the channels for a single track row of articles. Above the guide rails 4 there are two servomotors 5a, 5b to control the drive of the stopper cams 7a, 7b of the grouping station and that can become engaged with the articles 6. Under the guide rails there is a conveyor belt 8 that forms an essentially closed—that is gap-free—conveyor surface, said conveyor belt connecting flush to the articles conveyor 2 and aligned with it. A conveying means 9 that rises obliquely from bottom to top is arranged under this conveyor belt 8 for the purpose of supplying individual, separated carton blanks. As seen in the direction of transport of the conveyor belt 8, a rod conveyor 10 is arranged following the grouping station 1, said rod conveyor taking-on article groups 6' that have been isolated from the article flow with a specific intermediate spacing, continually pushing them onto flat, carton blanks (not illustrated) supplied from below while maintaining the spacing. These are then folded during further progression into so called multipacks and enveloped with shrink wrap film in a folding station 11. The film is guided obliquely from below through a transverse slot in the article group conveyor 14 between the underside of the multipacks and the upper side of the conveyor—in a manner known in and of itself—and then placed around the individual multipacks. A transfer of the enveloped multipacks to a shrink wrap tunnel takes place for the purpose of shrink wrapping. All of the above named component groups of the machine— with the exception of the grouping station—are driven synchronous in speed and position by a common machine drive 50.

Figure 3:
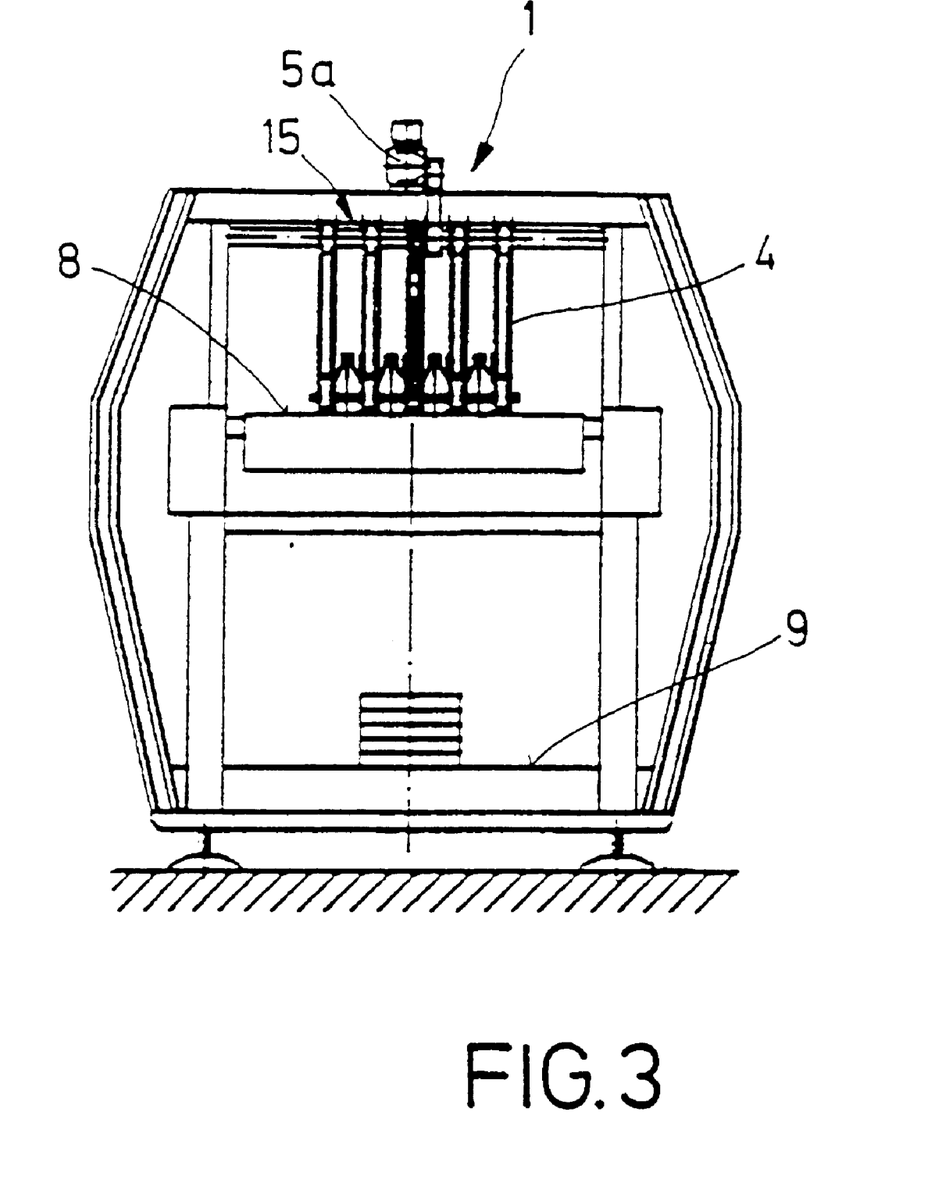
Figure 4:
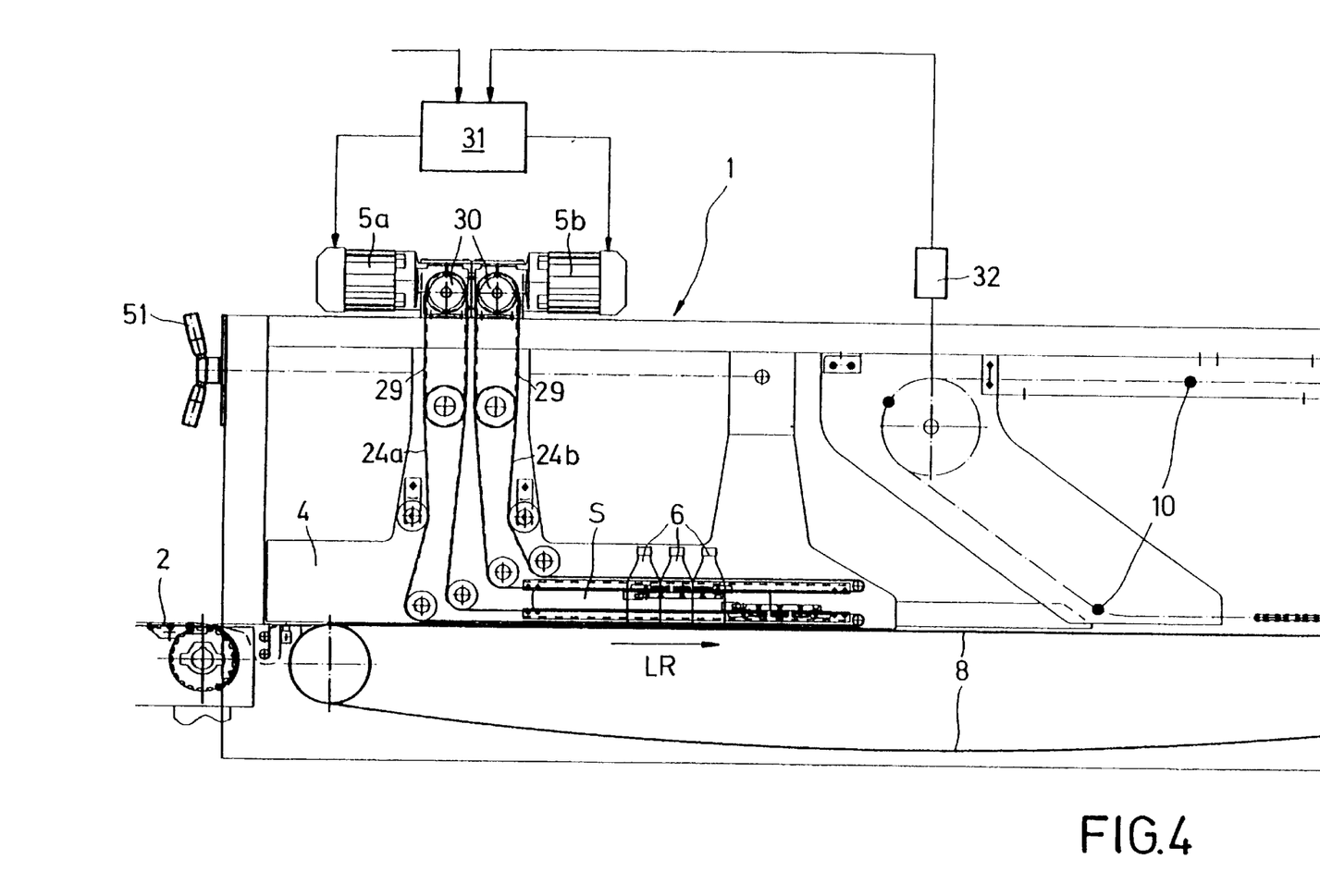
FIG. 4 the lateral view of the grouping station of the machine according to FIG. 1 in an enlarged illustration, FIG. 5 the top view of the grouping station according to FIG. 2 in an enlarged illustration, FIG. 6 an enlarged, detail view from the lateral view of FIG. 4, FIG. 7 a section viewed along the line A—A in FIG. 6, FIG. 8 a top view onto a guide channel of the grouping station according to FIG. 6, in an enlarged illustration, FIG. 9.1 to 9.6 the guide channel of the grouping station according to FIG. 8, in various functional settings, FIG. 10 a top view onto a guide channel of an isolation station for containers, FIG. 11.1 to 11.6 the guide channel of the isolation station for containers according to FIG. 10 in various to operational settings, FIG. 12 a top view of a second embodiment of the stopper cam with a mechanical control, and FIG. 13.1 to 13.5 the stopper cams according to FIG. 12 in different operational settings.

As can be seen in FIG. 3, the guide rails 4 are supported suspended on a transversely adjustable cross bar 15 that is positioned with clearance above the conveyor belt 8. A handle 51 is provided (FIG. 4) for transverse adjustment. In each of the guide rails 4 there are respectively two carriages 16a, 16b with stop bars 7a, 7b that are independent of each other and can move in various planes and that can be swiveled in a controlled manner. The mechanical construction of the carriage 16a, 16b can best be seen from FIG. 7.

Figure 7:
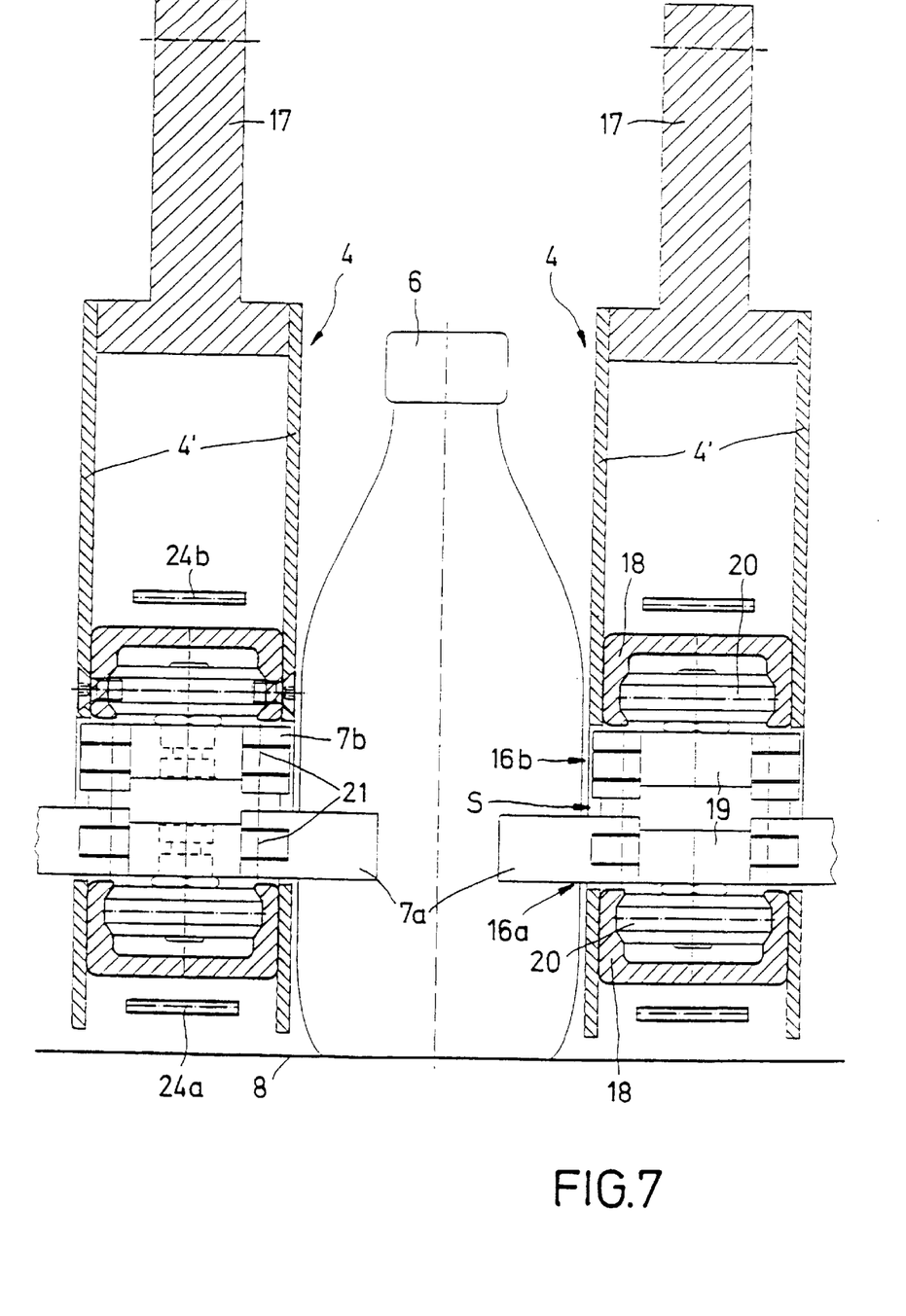

As can be seen from this sectioned illustration, the guide rails 4 respectively comprise two plates 4' that are aligned parallel and vertical with spacing from the conveyor belt 8. At the upper end there is a rail holder 17 between the indicated plates, and below there are two running tracks 18 that are horizontal and extend in parallel and have an essentially U-shaped cross section, whereby the open sides of the running tracks are directed toward each other and the inner surfaces of their leg sections feature profiling. The plates 4 are provide with horizontal slots S in the area between the spaced running tracks. Despite the slots, the stability of the plates is assured by means of the running tracks that are connected to the plates and that simultaneously serve as spacers and stiffening elements.

Figure 5:
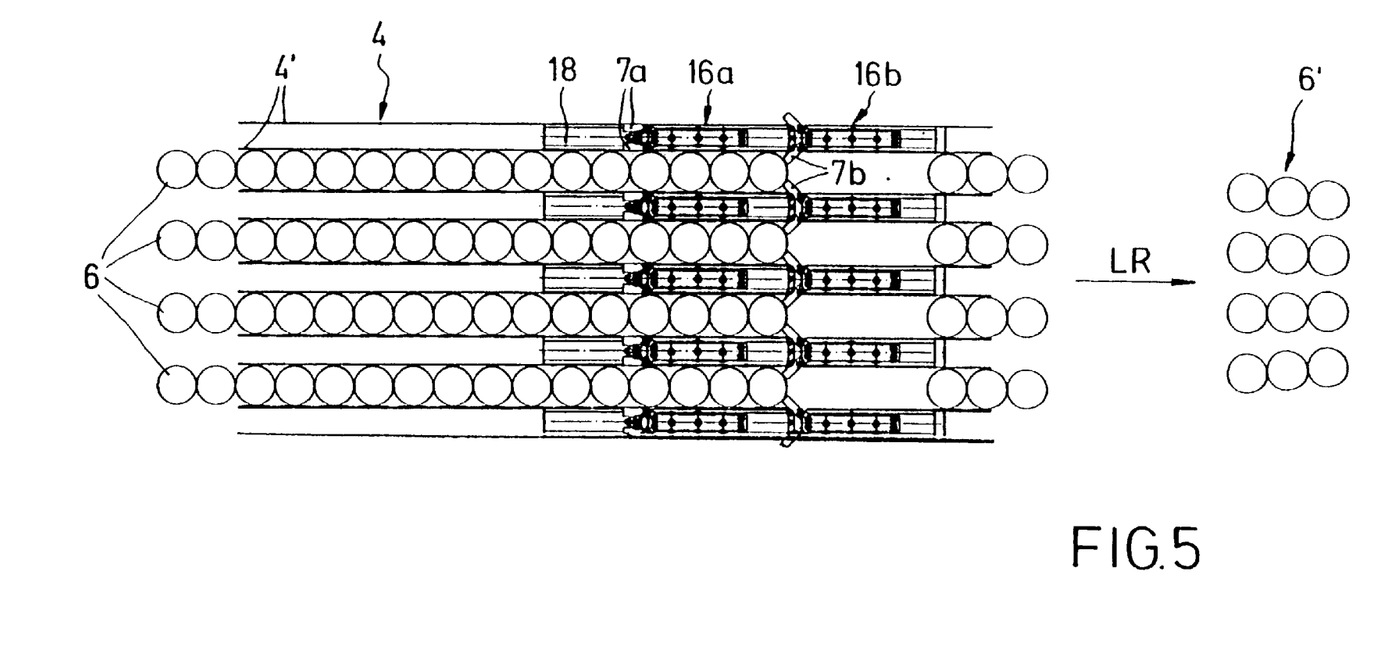
Figure 8:
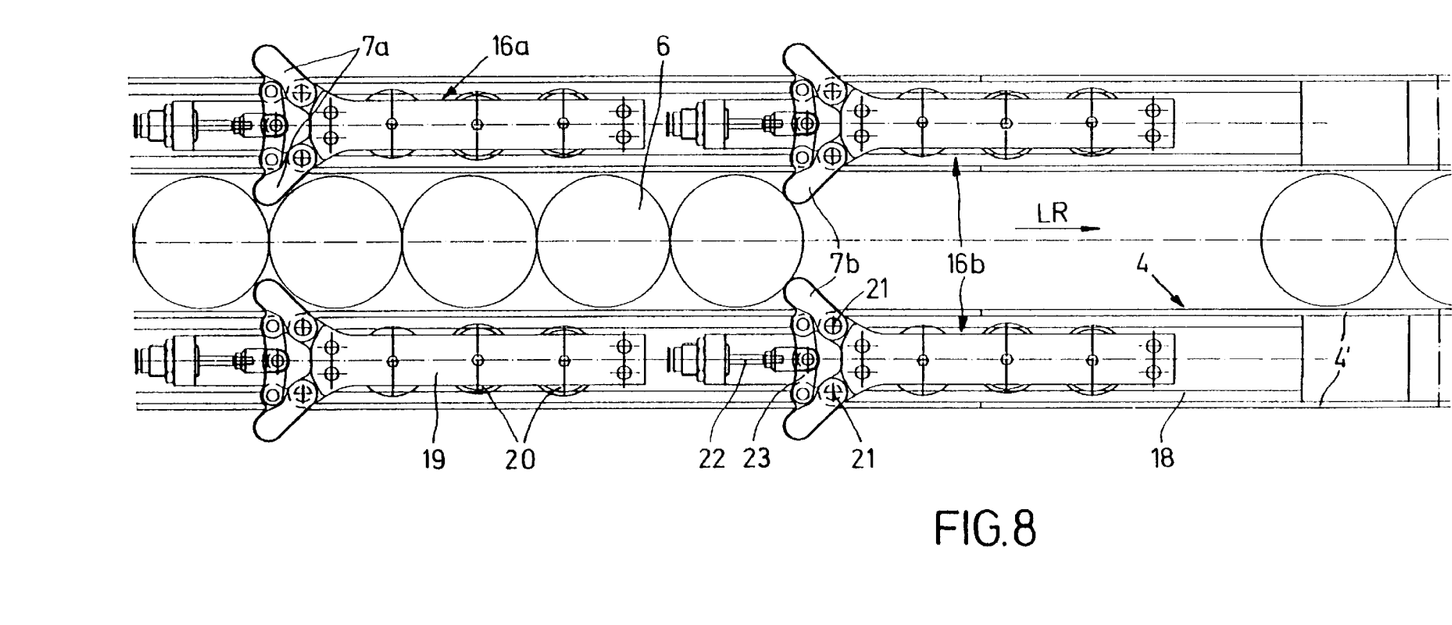
Figure 9:
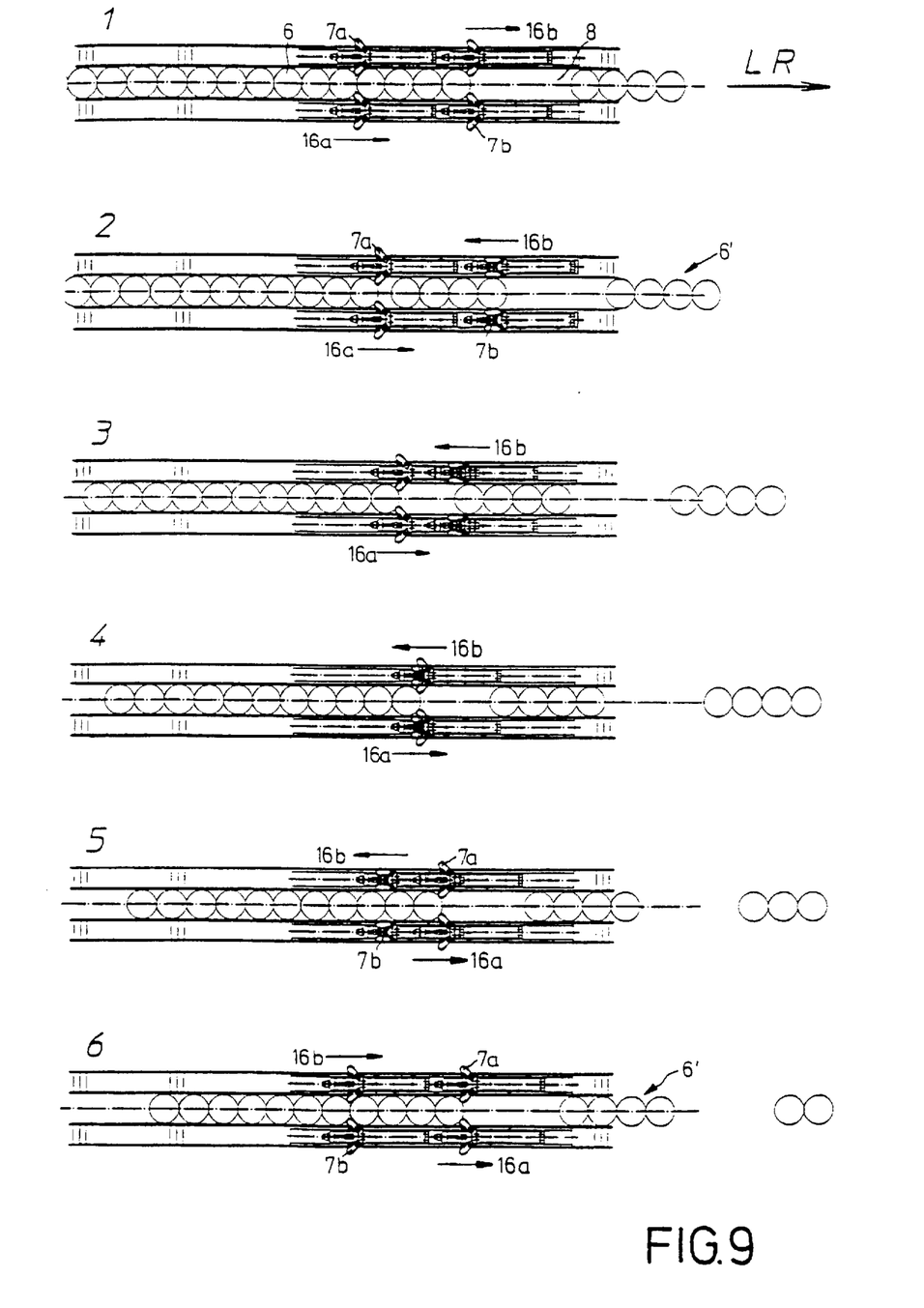

Each of the carriages 16a, 16b, is comprised of a longitudinal base body 19 with three rollers 20 arranged in a row and supported so as to rotate freely, guided in the profiling of the running tracks 18 in a form-locking manner, and at one end bears two stopper cams 7a, or 7b that are supported so as to swivel in opposite directions around vertical support axes 21. These stopper cams can be controlled by an actuation element 22 (pneumatic cylinder or the like) by means of a bent lever mechanism 23 (FIG. 8) that transitions from the stand-by position into a working position and the reverse. In FIG. 7 the stopper cams 7b of both upper carriages 16b are in the stand-by position, that is, completely within the guide rails 4, while the stopper cams 7a of the lower carriage 16a assume the working position, that is, laterally projecting through the slot S of the plates 4' into the guide channels formed by the guide rials (see also FIG. 5).

Figure 6:
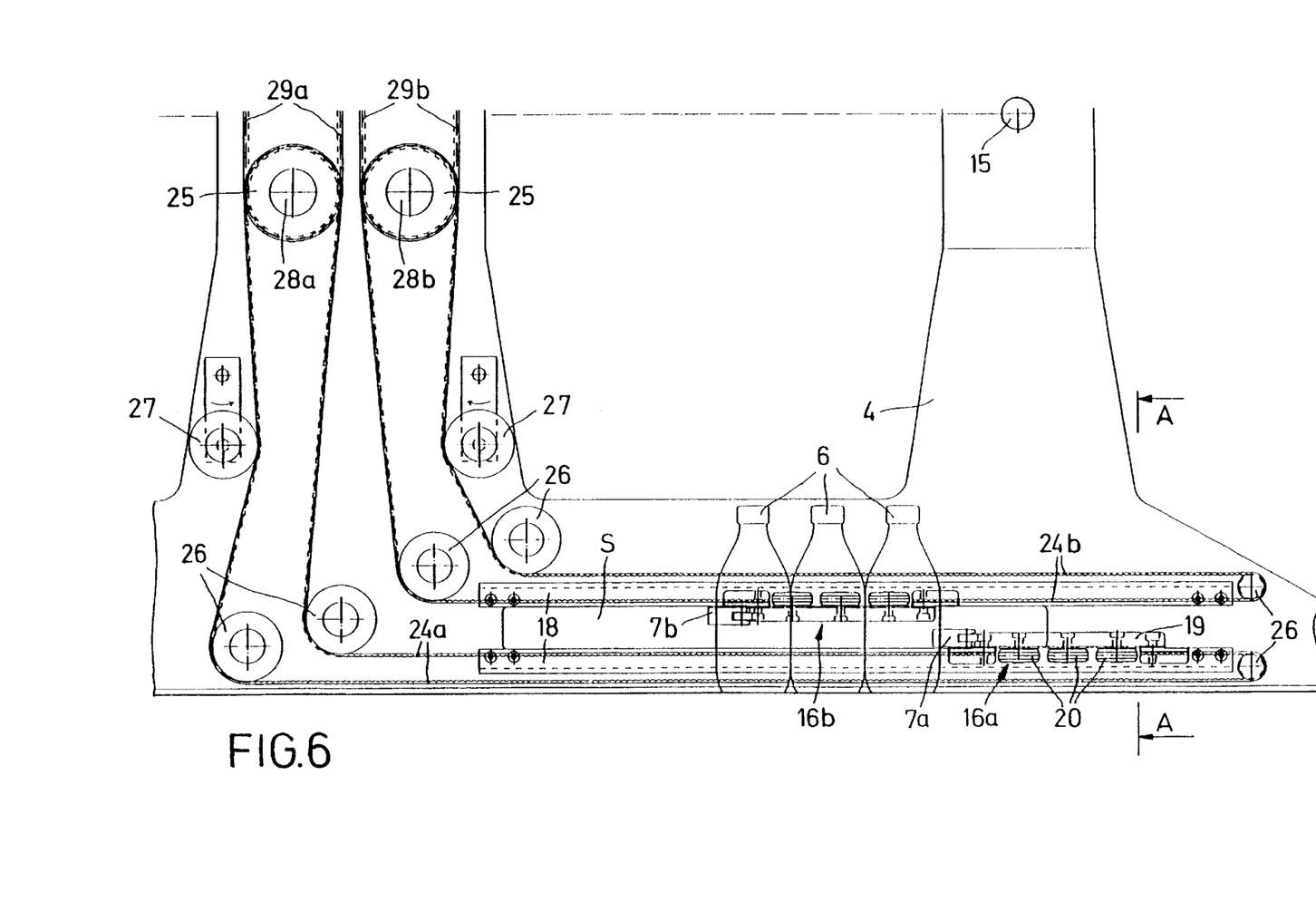

To drive the carriage 16a, 16b backward and forward in the running tracks 18, each carriage is provided with its own toothed belt 24a or 24b, the width of which is dimensioned such that it is guided and accommodated between the plates 4' of a guide rail (FIG. 7). A toothed belt is respectively guided by a drive wheel 25, three deflection wheels 26 and a tension roller 27, which are supported in the guide rail 4, while their arrangement can best be seen in FIGS. 4 and 6. The ends of the toothed belt are respectively fastened at the front and the rear end of a carriage 16a, 16b. The belts 25b of all upper carriages 16b are allocated to a first drive shaft 28b and those of the lower carriages 16a to a second drive shaft 28a. A drive wheel 25 designed as a cog wheel is respectively allocated to all of the toothed belts on the first or second drive shaft, whereby these cog wheels, together with the guide rails 4, can be displaced transverse to the conveying direction during a format conversion to a new article diameter, that is, the cog wheels 25 can be axially displaced on their corresponding drive shafts 28a or 28b and are guided in a form locking manner.

Every guide rail 4 thus forms a complete unit, so that additional guide channels can subsequently be formed with little expenditure by adding rails. The already described servo drives 5a, 5b drive the first or second drive shafts 28a, 28b by means of an endless, toothed belt 29 and the corresponding cog wheels 30 (see FIG. 4). The servo drives 5a, 5b are controlled by a servo control module of the machine control or a separate servo control 31 that is connected with it, so that a speed and position synchronous drive of the grouping device 1 is possible in the machine with respect to the remaining component groups of the machine in conjunction with an absolute value generator 32. In order to be able to undertake as smooth a conversion as possible to differing articles or container sizes or group lengths within the shortest time, the control 31 can be equipped with a selectable program memory for the various types of articles. The control, however, can also be adjusted for an input of desired groups or container lengths that is to be undertaken manually.

The manner of operation of the grouping station 1 of the machine illustrated in FIGS. 1 to 8 and previously explained relative to mechanical construction for packaging bottles in multipacks is described in the following in connection with the figure sequence 9.1 to 9.6 For the sake of simplicity, only a single, respective guide channel of the multi track grouping station is illustrated in the figure sequence in the various stages of a complete grouping cycle. However, as seen together with FIGS. 2 and 5, it is understood that the following, described sequence takes place for a multi track grouping station parallel in all guide channels at the same time or position. The initial setting shown in FIG. 9.1 corresponds exactly to the situation shown enlarged in FIG. 8. The stopper cams 7b of the carriage 16b in the right half of the illustration are in the working position, that is, they are spread toward the outside, penetrating the slots S of the guide rail 4 and projecting into the guide channel. Since the carriages 16b in this phase are moved at a somewhat slower speed in the direction of operation designated LR than the conveyor belt 8 bearing the bottles 6 by the servo drive 5b at a specific synchronous speed ratio, the frontmost bottle 6 of the gapless bottle row abuts the stopper cam 7b and is braked slightly by it relative to the conveyor belt 8, so that a slippage arises between the bottoms of the bottles and the conveyor belt. At the same instant the stopper cams 7a of the carriage 16a located on the left side of the illustration and also moved by the servo drive 5a in the direction of running LR have also spread outward from the stand-by setting, whereby these stopper cams 7a now form a stop surface for the upstream bottles.

Immediately thereafter, according to FIG. 9.2, the stopper cams 7b of the right carriage 16b are folded into the guide rails 4, that is, they are transferred into the stand-by position, whereby the bottle group 6' downstream of the stopper cams 16a and including four bottles from now on follows the conveyor belt 8 that abuts the bottles in a friction-locking manner at the unbraked, higher conveyor speed, and thereby an intermediate spacing arises that continually increases with respect to the following row of bottles that are braked by the stopper cams 7a and are thus slower. At the same time the servo drive 5b is reversed, the carriage 16b is accelerated upstream against the running direction LR of the bottles and counter to the direction to the carriage 16a, while the other two carriages 16a as before are congruously moved downstream by its servo drive 5a. In the counter movement sequence illustrated in FIG. 9.2 to 9.5 the upper carriages 16b cross over the lower carriages 16a and finally reach an upstream position, where the direction of movement of the carriage 16b is again reversed by the allocated servo drive 5b, that is, the carriages 16b are again accelerated in the running direction LR and the stopper cams 7b are spread outward in the working position between two neighboring bottles, so that a bottle group comprising four individual bottles is again subdivided from the flow of bottles. These stopper cams 7b are also again moved at slower speed than the conveyor belt 8 parallel to it. In the meantime, the bottle group 6' that were previously braked by the stopper cam pair 7b is distanced so far from the slower, following bottle flow that the separation dimension necessary for the rod conveyor 10 that follows the grouping station 1 has been achieved (FIG. 9.6). During the entire grouping process there is always at least one stopper cam in the working position, whereby a jolt-free and continually controlled separation of the bottles is assured.

Figure 10:
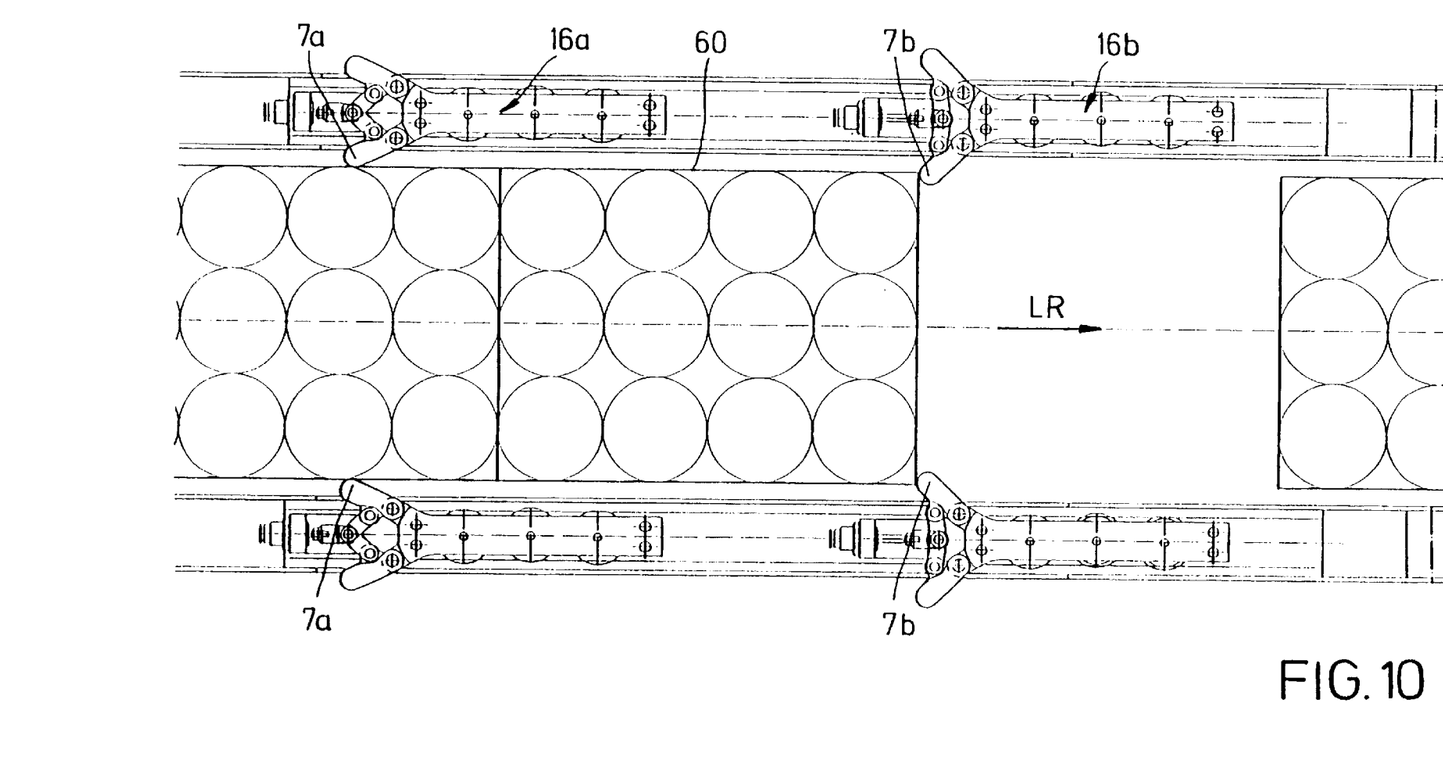
Figure 11:
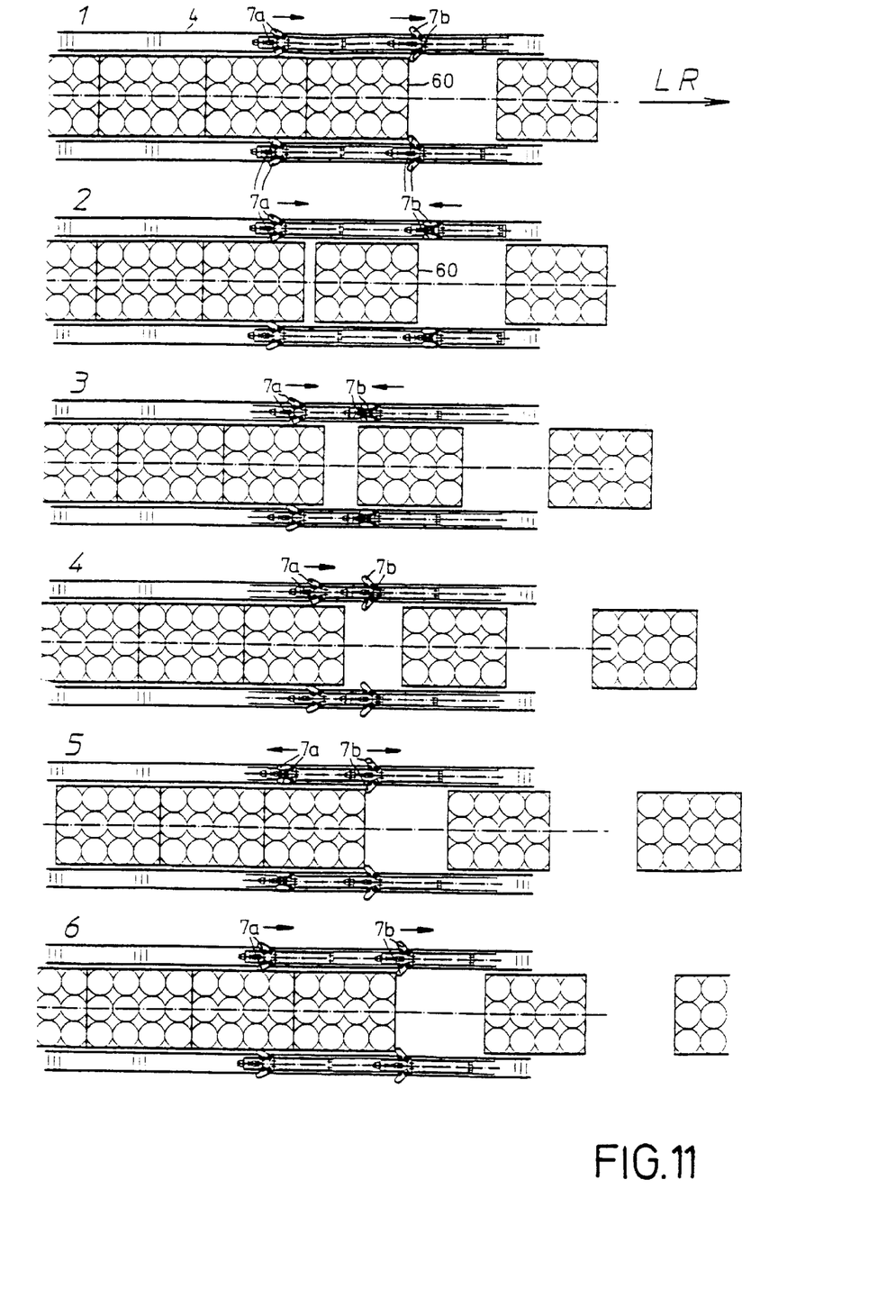

A second case of application is shown in FIGS. 10 and 11. The controlled stopper cams 7a and 7b are used here to isolate containers, e.g. multipacks, cartons or the like. Since these containers feature a square cross-section with planar lateral surfaces and there are no gaps for the engagement of the stopper cams during a blockage as a result of lateral surfaces that contact each other, the upstream stopper cam pair 7a is used as a clamping lever to laterally clamp a container 60, while the downstream stopper cam pair 7b, as in the previous exemplified embodiment, serves to group the bottles, serving as a stop for the frontmost container 60 of the entering flow of containers (FIG. 10).

The first illustration of the figure sequence 11.1 to 11.6 shows the initial position according to FIG. 10, that is the frontmost container 60 of the gapless flow of containers abuts the stopper cam 7b, while the following container is clamped between the stopper cams 7a in a friction locked manner.

In this situation both stopper cam pairs 7a and 7b are moved forward in the conveying direction LR at a slower speed than the conveyor belt that bears the containers in a friction locked manner, so that slippage between this and the containers arises. Thereafter, the stopper cams that are ahead are folded inward into the stand-by position, whereupon the released container is accelerated to the conveyor speed and thereby gains spacing with respect to the following containers. The dimension of the enlargement in spacing is determined by the indicated speed difference of the stopper cam and the conveyor belt and the time span between the release of a container until the release of the following container.

According to the illustration in FIG. 11.3, the stopper cam 7b that is put out of engagement is guided back upstream against the movement of the containers, while the second stopper cam 7a slides unchanged upstream. Then the stopper cams 7b are spread into the working position in the gap that in the meantime exists between the two containers and simultaneously the direction of movement of the stopper cam 7b is again reversed into the upstream direction, as soon as the front face of the following container comes into contact with the stopper cam 7b (FIG. 11.4 and 11.5).

Only then are the stopper cams taken out of engagement, that is folded inward into the stand-by position, driven upstream to the next container, whereupon, following another reversal of the direction of movement into the upstream direction the stopper cams 7a are again swiveled into the work position and the containers are thereby clamped laterally (FIG. 11.5 and 11.6).

Figure 12:
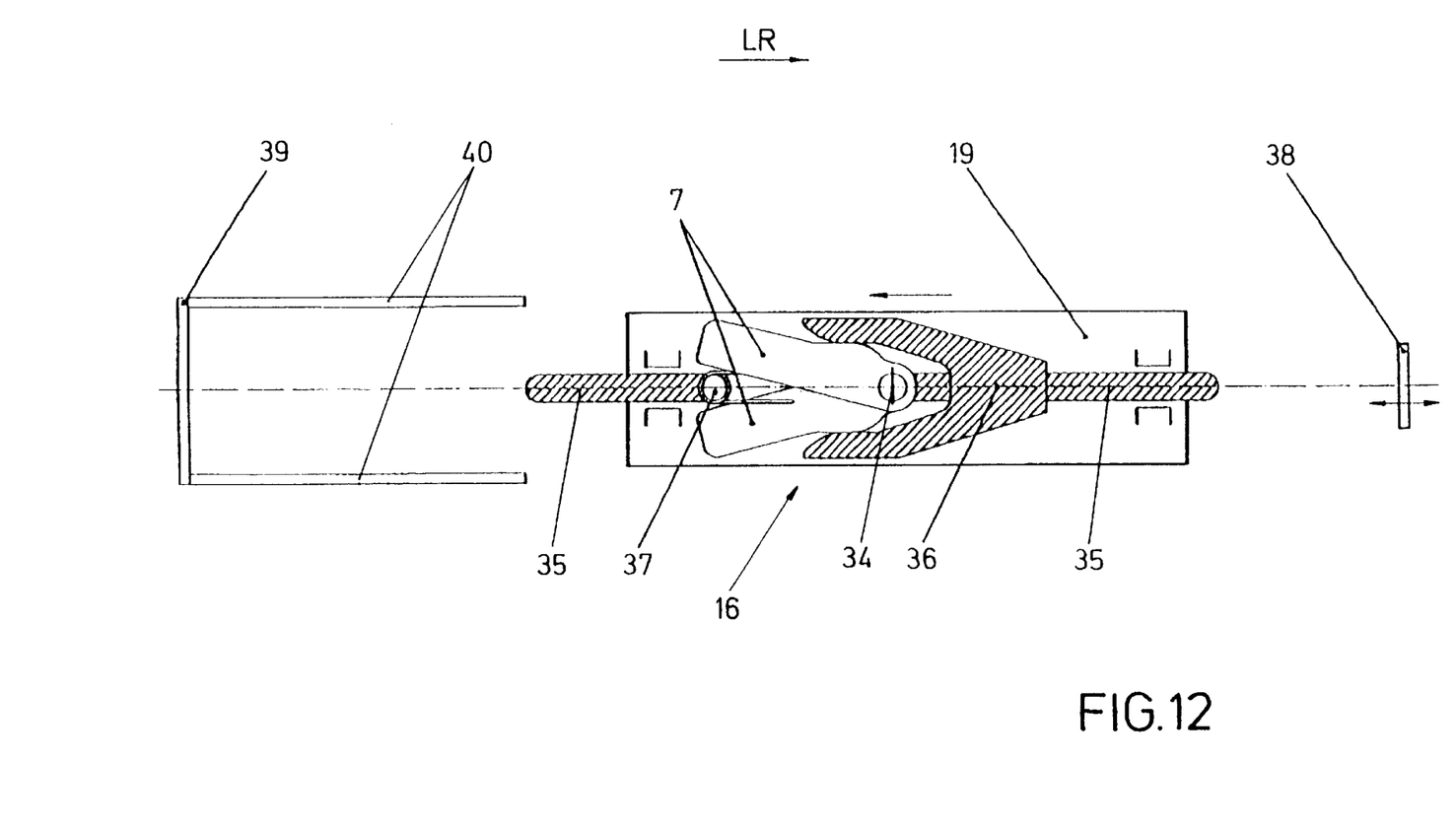
Figure 13:
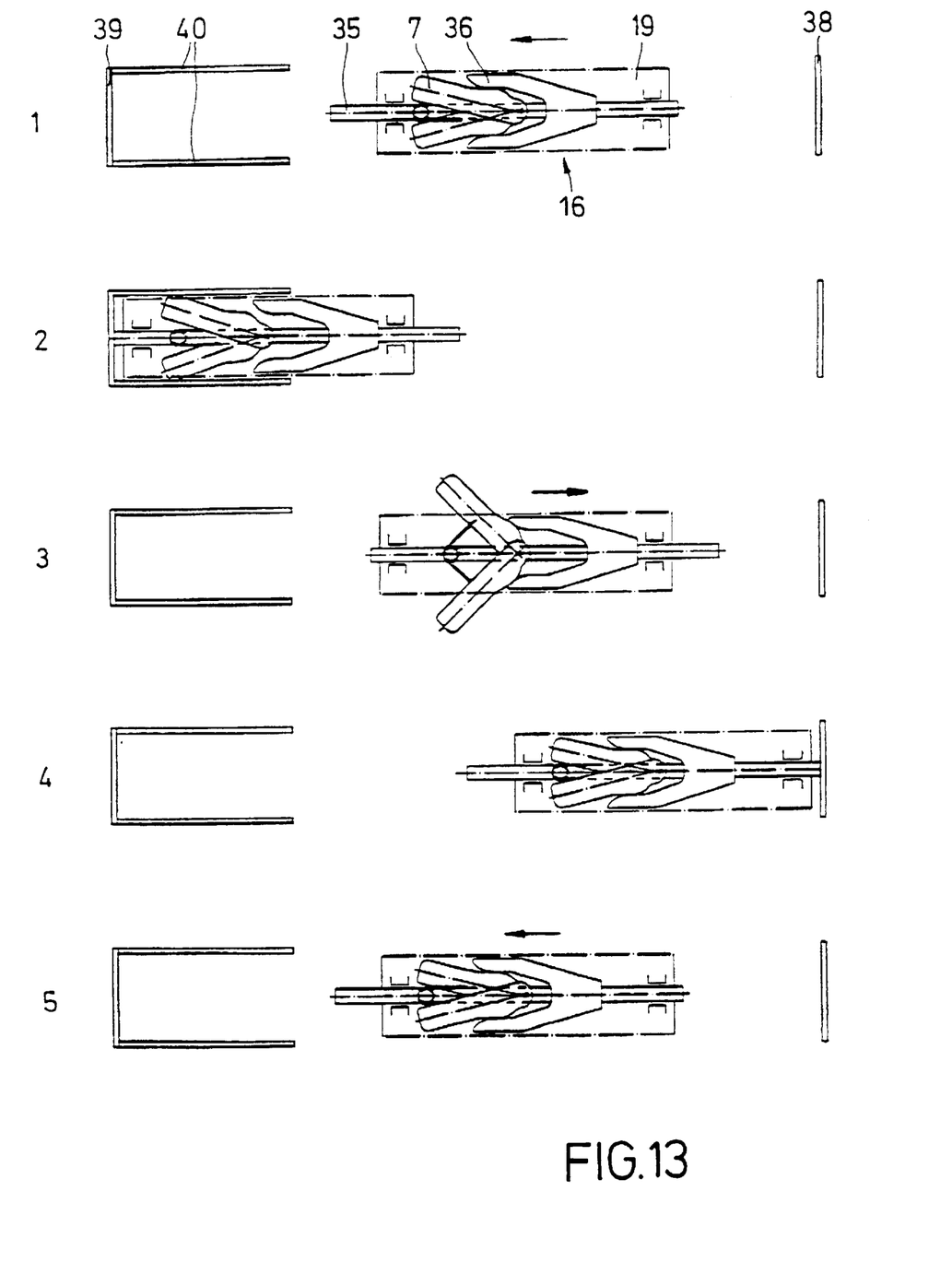

FIG. 12 shows a purely mechanically acting alternative embodiment to control the working and stand-by positions of the stopper cam. The illustrated stopper cam 7 is swivelably supported at one end on a bolt 34, said bolt being fastened to the base body 19 of the carriage 16. A push rod 35 guided in the axial direction on the base body parallel to the running direction LR bears a fork-like designed cam body 36 and a torsion spring 37 that permanently keeps the stopper cam spread outward into the work position. The upstream as well as the downstream end of the push rod 35 project laterally over the base body 19.

Two stops are located on the path of movement of the carriage 16, whereby at least the upstream stop 38 can be adjusted along the length of the running direction LR. As a result of two parallel legs 40, the upstream stop 39 has an essentially U-shaped design, whereby the carriage 16 can engage in between the two legs of the stopper cam 7 when the stopper cam 7 is in the stand-by position.

The stopper cams 7 in FIG. 13.1 are in the ready position, caused by the fork-shaped cam body 36 that, in part, laterally surrounds the stopper cam and forces it together. As soon as the left, that is, the upstream end of the push rod 35 contacts the stop 39, the movement of the cam body 36 stops, while the carriage 16 can move farther with the stopper cam 7, whereby the stopper cams are released from the cam body, but now are prevented from folding out by the legs 40 of the stop 39 (FIG. 3.2).

If the direction of drive of the carriage 16 is now reversed by the allocated servo drive, then the spring loaded stopper cams 7 can spread outward unhindered into the work position after leaving the legs 40 (FIG. 13.3), until the right, that is the upstream end of the push rod 35 hits the stop 38, so that the stopper cams 7 slide into the fork-like cam body 36 and thereby are folded inward into the stand-by position (FIG. 13.4). The direction of movement of the carriage 16 can then again be reversed (FIG. 13.5), whereby the described sequence starts again from the beginning. By adjusting the stops 38 and/or 39, the control points of the stopper cams of the respective group or container length can be appropriately adapted.

Deviating from the construction illustrated in the figures, the running tracks for the carriage can also be arranged above the articles which are to be grouped. In this case rods that project downward are provided on the carriages guided in the running tracks, said rods bearing the stopper cams at their lower ends, at the height of the article.

We claim:

1. Device (1) for grouping or isolating articles (6) which are transported in one or more closed rows on a conveyor belt (8) and which items are isolated as a group or individually for further handling, the improvement comprising at least two stopper elements (7a, 7b) for each row that are independent of each other, and that are mounted parallel to the direction of transport (LR), that can be driven backward and forward, and that can be brought independent of each other into or out of engagement with the article (6) in a controlled manner.

2. Device according to claim 1, and wherein said at least two stopper elements (7a, 7b) assume a work position that engages the articles (6) in the transport path during a forward movement in said direction of transport (LR) and further, wherein said stopper elements can be transferred into a stand-by position spaced from the articles during a reverse movement of said transport path against said direction of transport.

3. Device according to claim 1, wherein, in a multi track flow of articles, said at least two stopper elements (7a, 7b) that move independent of each other are respectively allocated to one conveyor track.

4. Device according to claim 1, wherein said at least two stopper elements (7a, 7b) that can move independent of each other are arranged on opposite sides of a conveyor track.

5. Device according to claim 1, wherein said at least two stopper elements (7a, 7b) are arranged on one side of a conveyor track in planes that are displaced in height and said stopper elements can be driven forward and backward independent of each other.

6. Device according to claim 4 or 5, wherein two groups of said at least two stopper elements (7a, 7b) are respectively arranged on both opposite facing sides of a conveyor track in two planes displaced in height and can be driven independent of each other, wherein said stopper elements that are respectively opposite on one, common plane can be driven synchronously on both sides of the conveyor track with respect to position.

7. Device according to claim 1 wherein said at least two stopper elements (7a, 7b) can be driven by drives that are independent of each other and reversible.

8. Device according to claim 1, wherein two groups of said at least two stopper elements (7a, 7b) are provided, wherein each said group is allocated to its own independent drive (5a, 5b), and wherein all said stopper elements belonging to one said group can be driven by its said own independent drive synchronously in equi-position with regard to one another.

9. Device according to claim 2, and rails (4) that fix said transport path of the articles form the conveyor tracks, and wherein said at least two stopper elements (7a, 7b) are supported so as to move in said rails (4).

10. Device according to claim 9 wherein said stopper elements (7a, 7b) in their said stand-by position are located completely within said rails and, when in their work position, project at least in part from said rails into said transport path of the articles (6).

11. Device according to claim 10, wherein said stopper elements (7a, 7b) are arranged and supported in pairs so as to move together in a said rail (4) such that, in said work position, said stopper elements project from the two sides of a said rail (4) directed away from each other into said article transport paths that are parallel to said rail.

12. Device according to claim 1, and a least two carriages (16, 16a, 16b) having an actuation element (22, 35, 36) that can be controlled for the purpose of transferring said stopper elements (7a, 7b) from their said stand-by position into said work position and the reverse.

13. Device according to claim 12, and at least two carriages (16, 16a, 16b) having an actuation element (22, 35, 36) that can be controlled for the purpose of the transferring said stopper elements (7a, 7b) from their said stand-by position into said work position and the reverse.

14. Device according to claim 12 or 13, wherein said carriage (16, 16a, 16b) respectively bears two said stopper elements (7a, 7b) that are supported so as to swivel in opposite directions, said stopper elements being coupled to a gearing unit (23, 37) and actuated by a common actuation element (22, 35, 36).

15. Device according to claim 2, wherein the conveyor tracks are formed by rails (4) that fix said transport path for the articles (6), wherein said rails respectively comprise two parallel plates (4') that are aligned vertically spaced, between which at least one horizontal running track (18) is fastened, and on which a carriage (16a, 16b) bearing at least one controllable stopper element (7a, 7b) is supported on running rollers (20) so as to move longitudinally, and said plates feature slots (S) that are allocated to the movement range of said stopper elements (7a, 7b).

16. Device according to claim 15, wherein two said running tracks (18) are fastened with spacing in parallel between said plates (4'), and said carriage (16a, 16b) is respectively supported on the sides directed toward each, and said slots (S) are located in plates (4') in the area between said running tracks (18).

17. Device according to claim 15 or 16, wherein each said carriage (16a, 16b) is fastened to a traction means (24a, 24b) that forms a closed loop, said traction means driven reversibly by means of a drive (5a, 5b).

18. Device according to claim 7 or 8, wherein said drives (5a, 5b) can be operated to be synchronized with respect to a packaging machine by means of a control (31), and the subdivision length of the device can be adjusted or programmed in a stepless manner by said control (31).

19. Device according to claim 13 wherein said stand-by position and said working position of said stopper elements (7a, 7b) are determined by stops (38, 39) that can be displaced parallel to said transport path.

20. Device according to claim 19, wherein at least one of the stops (38, 39) can be displaced parallel to the path of transport.

21. Device according to claim 7 or 8, wherein each said drive is an electro-servo drive.

22. Device according to claim 1, wherein said stopper elements are stopper cam members.

23. Device according to claim 22, wherein each said stopper cam member includes a fork-shaped cam body.

24. Device according to claim 1, wherein said stopper elements are stopper bar members.

25. Device (1) for grouping or isolating articles (6) which are transported in one or more closed rows on a conveyor belt (8) and which items are isolated as a group or individually for further handling, the improvement comprising at least two stopper elements (7a, 7b) that are independent of each other, and that are mounted parallel to the direction of transport (LR), that can be driven backward and forward, and that can be brought into or out of engagement with the article (6) in a controlled manner, wherein said at least two stopper elements (7a, 7b) that can move independent of each other are arranged in one of the group including:

on opposite sides of a conveyor track; and on one side of a conveyor track in planes that are displaced in height and said stopper elements can be driven forward and backward independent of each other;

wherein two groups of said at least two stopper elements (7a, 7b) are respectively arranged on both opposite facing sides of a conveyor track in two planes displaced in height and can be driven independent of each other, wherein said stopper elements that are respectively opposite on one, common plane can be driven synchronously on both sides of the conveyor track with respect to position.

26. Device (1) for grouping or isolating articles (6) which are transported in one or more closed rows on a conveyor belt (8) and which items are isolated as a group or individually for further handling, the improvement comprising at least two stopper elements (7a, 7b) that are independent of each other, and that are mounted parallel to the direction of transport (LR), that can be driven backward and forward, and that can be brought into or out of engagement with the article (6) in a controlled manner, and wherein two groups of said at least two stopper elements (7a, 7b) are provided, wherein each said group is allocated to its own independent drive (5a, 5b), and wherein all said stopper elements belonging to one said group can be driven by its said own independent drive synchronously in equi-position with regard to one another.

27. Device (1) for grouping or isolating articles (6) which are transported in one or more closed rows on a conveyor belt (8) and which items are isolated as a group or individually for further handling, the improvement comprising at least two stopper elements (7a, 7b) that are independent of each other, and that are mounted parallel to the direction of transport (LR), that can be driven backward and forward, and that can be brought into or out of engagement with the article (6) in a controlled manner, and wherein said at least two stopper elements (7a, 7b) assume a work position that engages the articles (6) in the transport path during a forward movement in said direction of transport (LR) and further, wherein said stopper elements can be transferred into a stand-by position spaced from the articles during a reverse movement of said transport path against said direction of transport, and rails (4) that fix said transport path of the articles form the conveyor tracks, wherein said at least two stopper elements (7a, 7b) are supported so as to move in said rails (4), wherein said stopper elements (7a, 7b) in their said stand-by position are located completely within said rails and, when in their work position, project at least in part from said rails into said transport path of the articles (6).

28. Device according to claim 27, wherein said stopper elements (7a, 7b) are arranged and supported in pairs so as to move together in a said rail (4) such that, in said work position, said stopper elements project from the two sides of a said rail (4) directed away from each other into said article transport paths that are parallel to said rail.

29. Device (1) for grouping or isolating articles (6) which are transported in one or more closed rows on a conveyor belt (8) and which items are isolated as a group or individually for further handling, the improvement comprising at least two stopper elements (7a, 7b) that are independent of each other, and that are mounted parallel to the direction of transport (LR), that can be driven backward and forward, and that can be brought into or out of engagement with the article (6) in a controlled manner, wherein said stopper elements (7, 7a, 7b) are formed on a carriage (16, 16a, 16b) that can move parallel to said transport path of the article (6), moving in a manner similar to a thumb, and wherein said stopper elements are supported so as to swivel around a vertical axis (21, 34).

30. Device according to claim 29, and a least two carriages (16, 16a, 16b) having an actuation element (22, 35, 36) that can be controlled for the purpose of transferring said stopper elements (7a, 7b) from their said stand-by position into said work position and the reverse.

31. Device according to claim 29 or 30, wherein said carriage (16, 16a, 16b) respectively bears two said stopper elements (7a, 7b) that are supported so as to swivel in opposite directions, said stopper elements being coupled to a gearing unit (23, 37) and actuated by a common actuation element (22, 35, 36).

32. Device according to claim 27, and wherein the conveyor tracks are formed by rails (4) that fix said transport path for the articles (6), wherein said rails respectively comprise two parallel plates (4') that are aligned vertically spaced, between which at least one horizontal running track (18) is fastened, and on which a carriage (16a, 16b) bearing at least one controllable stopper element (7a, 7b) is supported on running rollers (20) so as to move longitudinally, and said plates feature slots (S) that are allocated to the movement range of said stopper elements (7a, 7b).

33. Device according to claim 32, wherein two said running tracks (18) are fastened with spacing in parallel between said plates (4'), said carriage (16a, 16b) is respectively supported on the sides directed toward each, and said slots (S) are located in plates (4') in the area between said running tracks (18).

34. Device according to claim 32 or 33, wherein each said carriage (16a, 16b) is fastened to a traction means (24a, 24b) that forms a closed loop, said traction means driven reversibly by means of a drive (5a, 5b).

35. Device according to claim 30 wherein said stand-by position and said working position of said stopper elements (7a, 7b) are determined by stops (38, 39) that can be displaced parallel to said transport path.

36. Device according to claim 35, wherein at least one of the stops (38, 39) can be displaced parallel to the path of transport.

37. Device (1) for grouping or isolating articles (6) which are transported in one or more closed rows on a conveyor belt (8) and which items are isolated as a group or individually for further handling, the improvement comprising at least two stopper elements (7a, 7b) that are independent of each other, and that are mounted parallel to the direction of transport (LR), that can be driven backward and forward, and that can be brought into or out of engagement with the article (6) in a controlled manner, wherein said stopper elements are stopper cam members and each said stopper cam member includes a fork-shaped cam body.

* * * * *

UNITED STATES PATENT AND TRADEMARK OFFICE
CERTIFICATE OF CORRECTION

PATENT NO. : 6,360,871 B1
DATED : March 26, 2002
INVENTOR(S) : Meyer et al.

It is certified that error appears in the above-identified patent and that said Letters Patent is hereby corrected as shown below:

Column 9,
Line 26, "and a least" should read -- and at least --.

Signed and Sealed this

Twenty-third Day of July, 2002

Attest:

Attesting Officer

JAMES E. ROGAN
Director of the United States Patent and Trademark Office